United States Patent [19]
Deiss et al.

[11] Patent Number: 5,542,793
[45] Date of Patent: Aug. 6, 1996

[54] ROTARY CUTTING TOOL WITH AXIALLY PRECISION POSITIONED END CUTTING INSERTS

[75] Inventors: Siegfried Deiss, Gomaringen; Willy Schlotterer, Nehren, both of Germany

[73] Assignee: Walter AG, Tübingen, Germany

[21] Appl. No.: 280,007

[22] Filed: Jul. 25, 1994

[30] Foreign Application Priority Data

Aug. 3, 1993 [DE] Germany .......................... 43 25 999.5

[51] Int. Cl.[6] ...................................... B23C 5/00
[52] U.S. Cl. ................... 407/35; 407/48; 407/104
[58] Field of Search .................... 407/35, 40, 41, 407/47, 48, 49, 102, 103, 104

[56] References Cited

U.S. PATENT DOCUMENTS

| | | |
|---|---|---|
| 4,182,587 | 1/1980 | Striegl . |
| 4,283,163 | 8/1981 | Grafe et al. . |
| 5,049,011 | 9/1991 | Bohnet et al. . |
| 5,083,887 | 1/1992 | Dotany . |
| 5,129,767 | 7/1992 | Satran et al. ............ 407/47 X |
| 5,160,228 | 11/1992 | Arai et al. ............ 407/103 X |
| 5,199,828 | 4/1993 | Forsberg et al. ............ 407/104 |
| 5,346,336 | 9/1994 | Rescigno ............ 407/104 |

FOREIGN PATENT DOCUMENTS

| | | |
|---|---|---|
| 0051775 | 5/1982 | European Pat. Off. . |
| 2110078 | 9/1971 | Germany . |
| 2452099 | 5/1976 | Germany . |
| 3314049A1 | 10/1984 | Germany . |
| 1040067 | 12/1964 | United Kingdom . |
| 2098105 | 11/1982 | United Kingdom . |

*Primary Examiner*—S. Thomas Hughes
*Attorney, Agent, or Firm*—Frishauf, Holtz, Goodman, Langer & Chick, P.C.

[57] ABSTRACT

To support an indexable cutting insert (6a) cutting with an end edge and facing edge (7a) as well as circumferentially, with respect to both axially acting forces as well as radially acting forces, the tool body (1) is formed with an abutment surface (17) to accept radially directed forces against which the insert can be clamped; to accept axially directed forces, a holding screw (25) passing through an opening (22, 23) in the insert is formed with an accurately machined portion (28) fitting into an accurately machined portion (29) of a reception bore (27) for the screw, so that the holding screw, itself, acts as an accurately placed axial support for the insert (6a).

10 Claims, 6 Drawing Sheets

Fig. 7

ROTARY CUTTING TOOL WITH AXIALLY PRECISION POSITIONED END CUTTING INSERTS

Reference to related patents, the disclosures of which are hereby incorporated by reference:
U.S. Pat. No. 4,283,163, Cräfe et al.
U.S. Pat. No. 5,049,011, Bohnet et al.
U.S. Pat. No. 5,083,887, Dotany.

FIELD OF THE INVENTION

The present invention relates to a rotary cutting tool, and more particularly a milling or boring head, having cutting inserts secured thereto. Such tools are used in metalworking. Customarily, they have a body formed as a body of rotation on which a plurality of insert reception seats are formed, which support indexable or replaceable cutting inserts or chips in radial and axial directions. The chips are formed with holes therethrough, for attachment to the body, at the respective seats, by means of threaded screws.

BACKGROUND

It is important that milling cutters and boring tools with replaceable or indexable cutting chips or inserts are so constructed that the inserts are precisely positioned with respect to the axis of rotation, and hence on the body of the tool. Only precise positioning ensures that accurate circular cutting and plane or end cutting by the cutting edges of the cutter bits can be ensured. Milling or boring heads which are to cut sharply defined corners, and milling heads in which individual cutting chips are located along a spiral path, are usually so constructed that the body of the tool itself is formed with pocket-like recesses which define an engagement or seating surface for the cutting chips. These surfaces are delimited by precisely finished lateral surfaces to form abutments for a cutter bit secured to the respective seating or engagement surface.

It has been proposed to use apertured index elements or chips which are attached to the respective seating surface by a clamping bolt (see the referenced U.S. Pat. No. 4,283,163, Gräfe et al). To ensure a snug fit, the clamping bolt has a radially projecting conical portion between the clamping head and the threaded part thereof. By slight lateral elastic deformation of the clamping bolt against the inner wall of the opening in the chip, which preferably is also conically formed and decreased inwardly in diameter. By suitable selection of the size and the direction of the relative offset of the axes of the threaded bore and the body of the tool and the bore or opening in the indexing chip, forces directed towards the engagement surface or seat can be predetermined. These forces press the chip against the engagement surface.

Closed seats for chips, for example of the type described in the referenced Bohnet et al., U.S. Pat. No. 5,049,011, are expensive to make, and hence, in use, costly. This is true particularly for milling cutters which have the chips arranged along spirals, so that, in effect, a spirally toothed tool is generated. The chips are placed along the circumference of the tool body in screw-like spiral cutter rows. The referenced Dotany U.S. Pat. No. 5,083,887 shows such a cutting tool.

To reduce the complexity and cost of manufacture of such tools, a preferred form has been proposed in which the precise engagement of the cutting insert on the surface is defined by a pin. This pin is fitted, in essentially radially or tangentially formed openings in the tool body, and has, if desired, a precisely machined engagement surface for the cutting insert.

Such pins, particularly in spirally toothed index insert milling cutters, cause problems with respect to cutting chip removal. Cutting chips can catch or wedge between the pin and the subsequent cutting insert. Difficulties also arise when inserts of a large corner radius are used, since it is difficult to provide an accurately axially defined abutment. The pin, to provide a suitable abutment and define a position, must extend over a comparatively long distance from the body in order to ensure a reliable engagement at larger corner radii. Pins which are used in spirally toothed tools must be fitted in the tool body, which may lead to weakening of the tool body due to the bores in which the pins are to be received. This weakening reduces the lifetime of the tool body itself.

THE INVENTION

It is an object to provide a rotary cutting tool on which cutting inserts can be accurately positioned axially as well as radially, which can be readily made, and in which the inserts can be securely clamped on the tool body with predetermined clamping force, and in which cutting chips are readily removed. Such tools are particularly suitable as metalworking tools, especially boring and milling tools.

Briefly, the cutting tool inserts are accurately positioned by forming a single positioning abutment surface adjacent the seating or engagement surface of the index chip on the tool. This provides for positioning of the index chip with respect to one of two directions, namely axially and radially, and to accept forces arising in operation of the cutting tool with respect to that one direction. The other direction is accurately predetermined by forming the holding screw for the inserts, the opening, typically a threaded bore, in the body of the cutting tool for the holding screw, and the opening in the insert itself to define an interengaging fit, so that the holding screw itself will form a definitive positioning element for the insert.

The engagement seat for the insert, typically, extends transversely to the axis of the hole or opening in the insert.

In accordance with a preferred feature of the invention, the holding screw is formed as an accurately dimensioned screw fitting into an accurately dimensioned bore, coaxial with the shank of the screw. This threaded bore, preferably, has an essentially cylindrical portion, accurately machined and positioned, to accept a similar, accurately machined and positioned cylindrical portion on the holding screw or bolt for the insert. Tolerances between these cylindrical portions should be close to provide accurate positioning of the screw within the body of the tool.

Using the attachment screw, with its accurate positioning fit in the tool, directly as a positioning element permits elimination of external, additional positioning aids, such as pins, shims, and the like; this, further, ensures a simple and inexpensive manufacture of the tool as a whole.

The invention is applicable to various types of tools, for example narrow tools, such as disk mills, T-groove mills, and the like, and which are so small that it would not have been possible to provide additional positioning elements or aids, such as pins, in accordance with the prior art, due to lack of space, or undue weakening of the tool body.

The force of engagement of the insert can be precisely predetermined by slightly offsetting the axis of the bore in the tool body with respect to the axis of the hole or opening in the insert, in the direction towards the fixed abutment surface of the tool body.

The clamping head of the clamping screw or bolt can be formed in any convenient shape. It may be conical, ball-shaped, concave, convex, or cylindrical, with a clamping shoulder. The fitted interengaging surfaces of the screw or bolt, usually and preferably, will be cylindrical. The diameter of the screw extending through the bore of the insert will be smaller than the diameter of the surrounding region Of the bore of the insert so that, when the clamping screw is tightened, only the clamping head will engage the walls of the opening of the insert, to ensure an at least essentially completely circumferential engagement between the head of the clamping screw and the insert.

In a spiral milling cutter, fitted with indexable inserts, the respective inserts are supported in radial direction by the abutment surface, which may be an abutment shoulder, on the body of the tool; the clamping screw and the interengaging fitting surfaces on the screw and in the tool body take over the support of the insert in axial direction while, simultaneously, ensuring stress engagement of the insert against the abutment surface on the tool body and the clamping force of the insert with respect to its seating or engagement surface.

DETAILED DESCRIPTION

Figure 1:
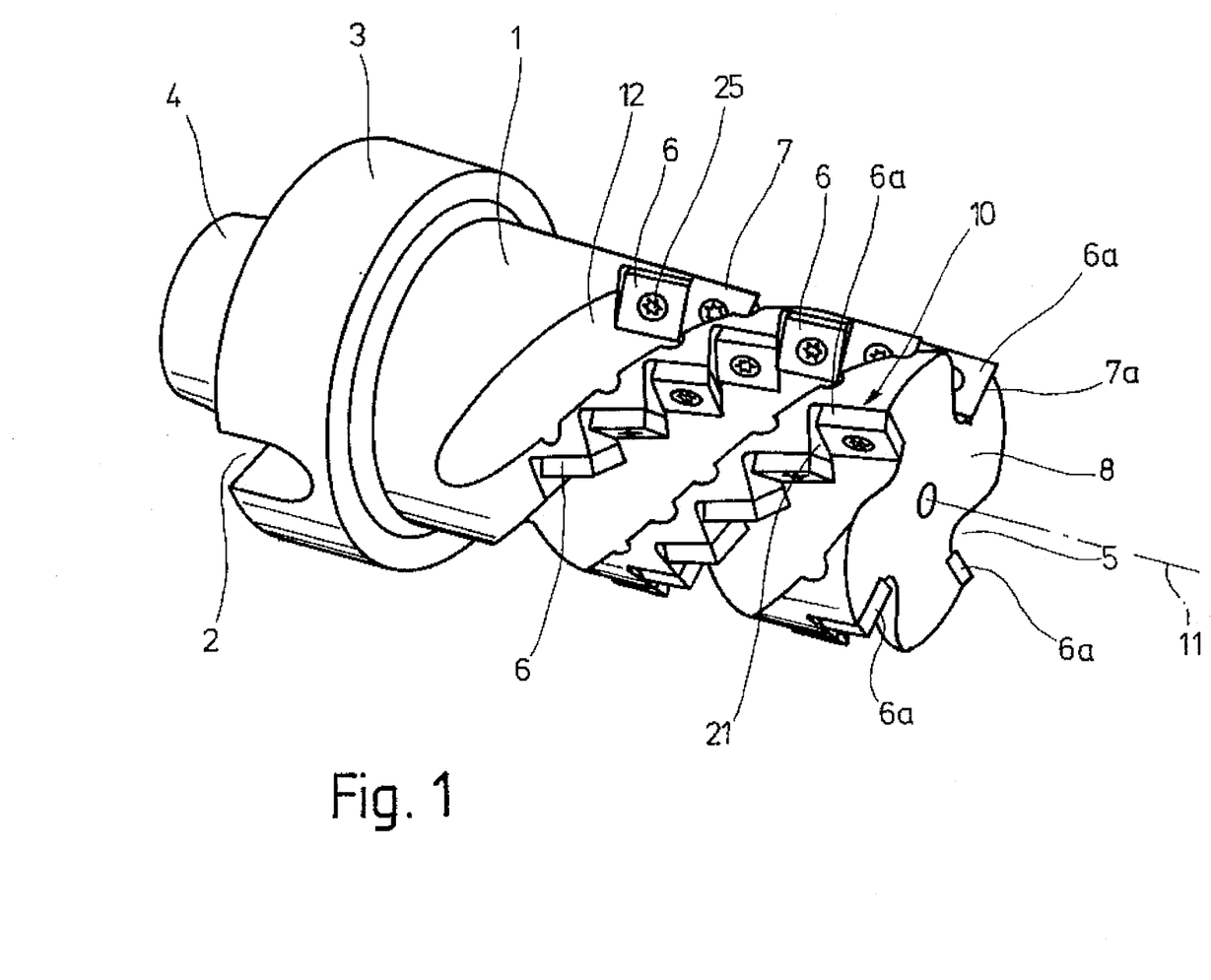
FIG. 1 is a pictorial, perspective, highly schematic showing of a spiral milling head, fitted with indexable cutting inserts, with a left spiral, and arranged for right cutting, in which four spiral grooves are formed.
Figure 2:
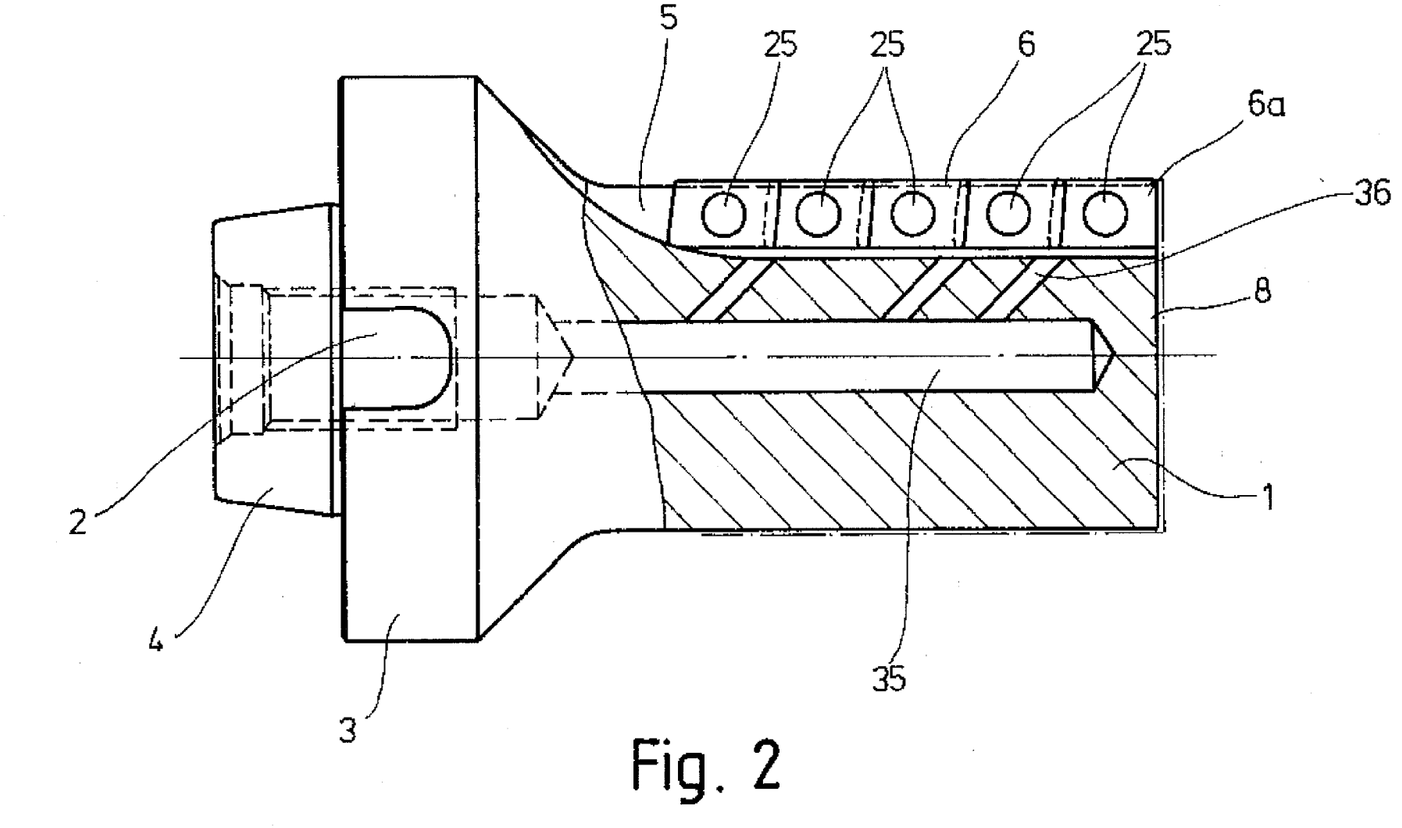
FIG. 2 is a side view of the milling head of FIG. 1, in partly axial section.
Figure 3:
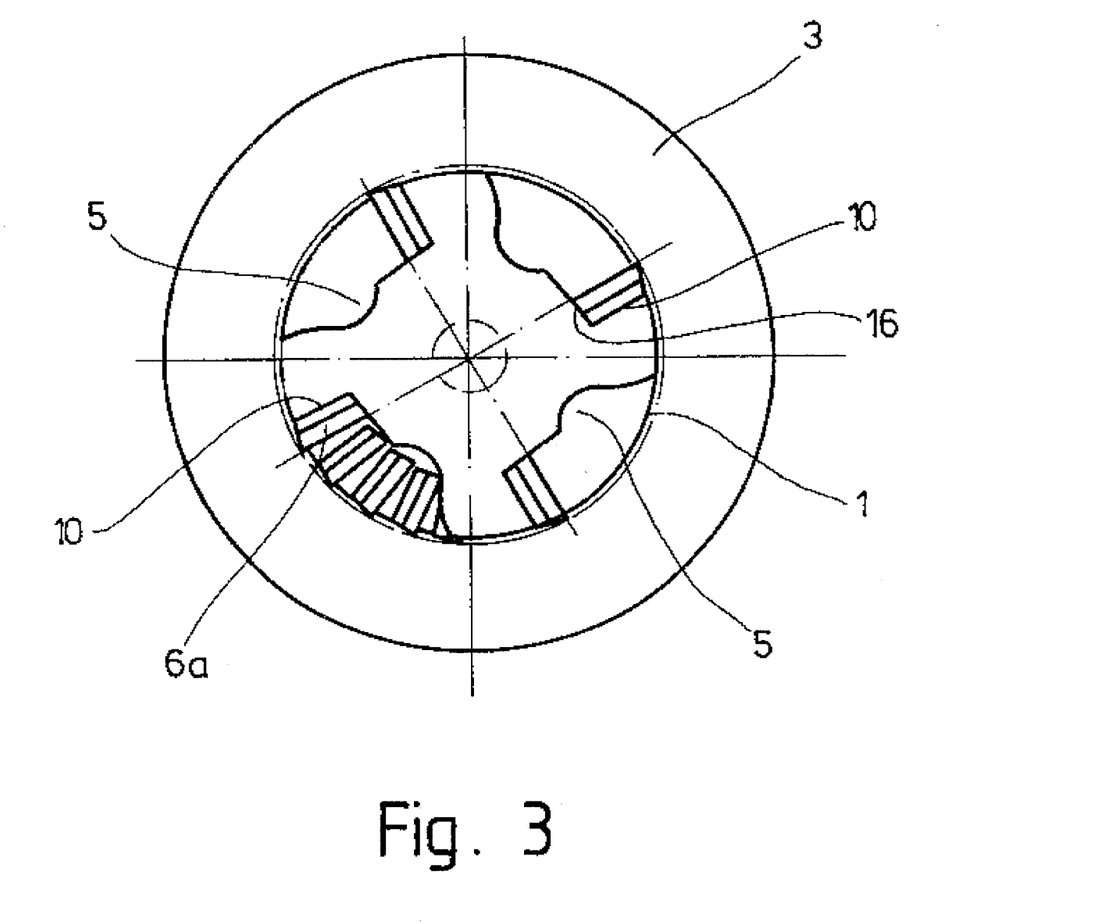
FIG. 3 is an end view of the tool of FIG. 1.

Referring first to FIGS. 1–3, which show, generally, a rotary cutting tool in form of a spiral-toothed milling head. Such heads are used, particularly, for rotary milling, edge milling, and the like, of metallic workpieces. Basically, the cutting tool has an essentially cylindrical tool body 1, formed with a ring flange, on which a follower groove 2 is cut. A short taper holder 4 is provided to couple the milling head in a suitable reception portion of the milling machine. The tool body is made of steel, and is formed with four spiral clamping grooves 5 of similar pitch. They are left-spiraled, and fitted with square or parallelogram-shaped indexable cutting inserts 6, thus providing four cutting rows, defined by the four clamping grooves 5.

The cutting inserts 6 are so arranged that adjacent cutting chips 6 overlap, in axial direction, so that each cutting row forms an essentially closed theoretical cutting surface. Other arrangements may be used, for example in which the inserts 6 of adjacent insert rows are located with gaps with respect to each other in such a manner that always two cutting rows define a complete theoretical cutting surface. The cutting inserts 6 are specially arranged on the tool body 1.

Each one of the cutting rows has cutting inserts 6 in which the cutting insert 6a is at the facing end. It has an end cutting edge 7a which projects over the end surface 8 of the tool body 1. All the cutting surfaces 7a are in a common plane, illustrated in FIGS. 5 and 6 by the chain-dotted line 9. The main or circumferential cutting edges 7 of the insert 6a, as well as of the insert 6, define a theoretical cutting circle shown in FIG. 4 by the chain-dotted line 14.

Figure 4:
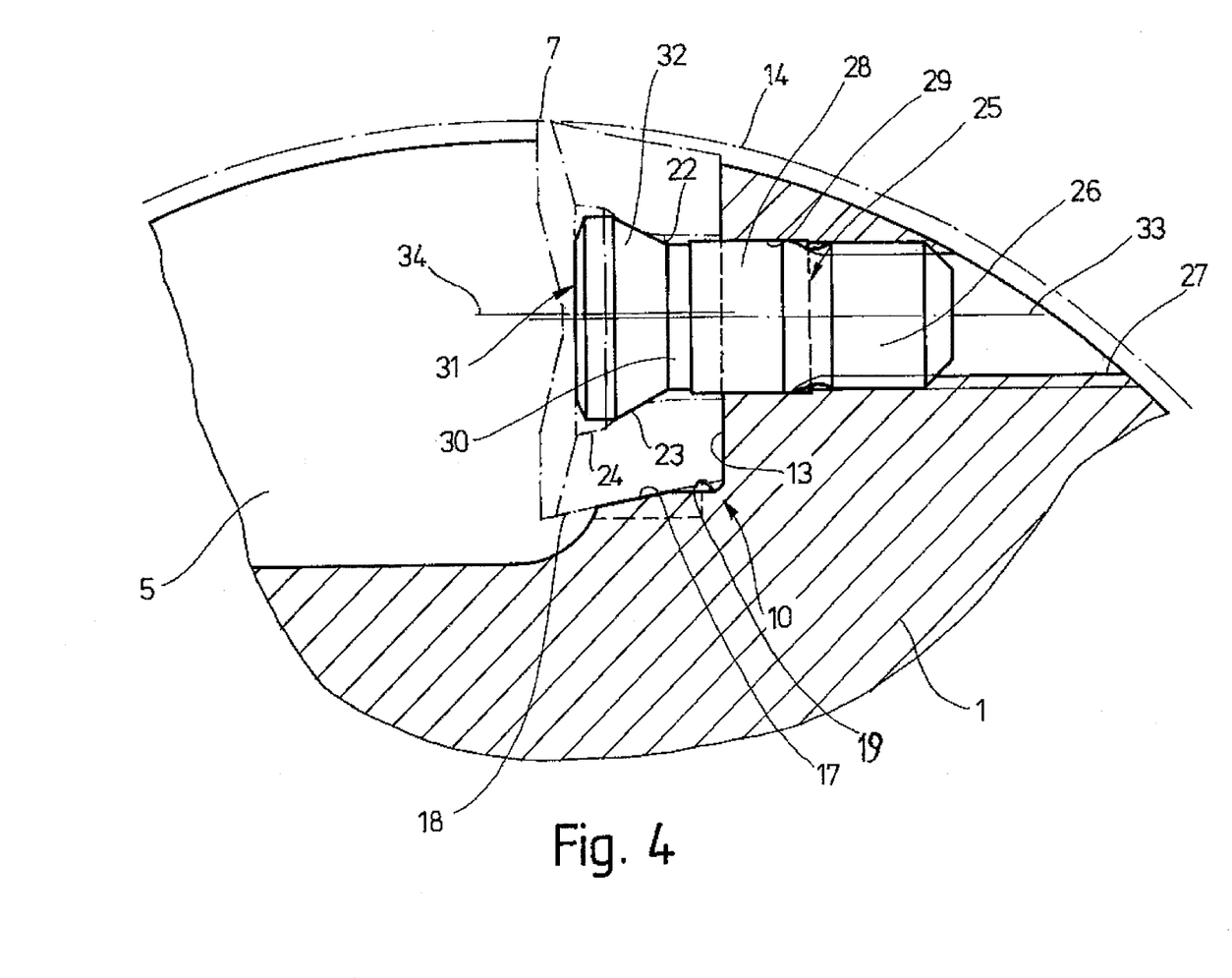
FIG. 4 is a fragmentary view, to another scale, and illustrating, in side view, an insert seated on a seating surface, and clamped in position.
Figure 5:
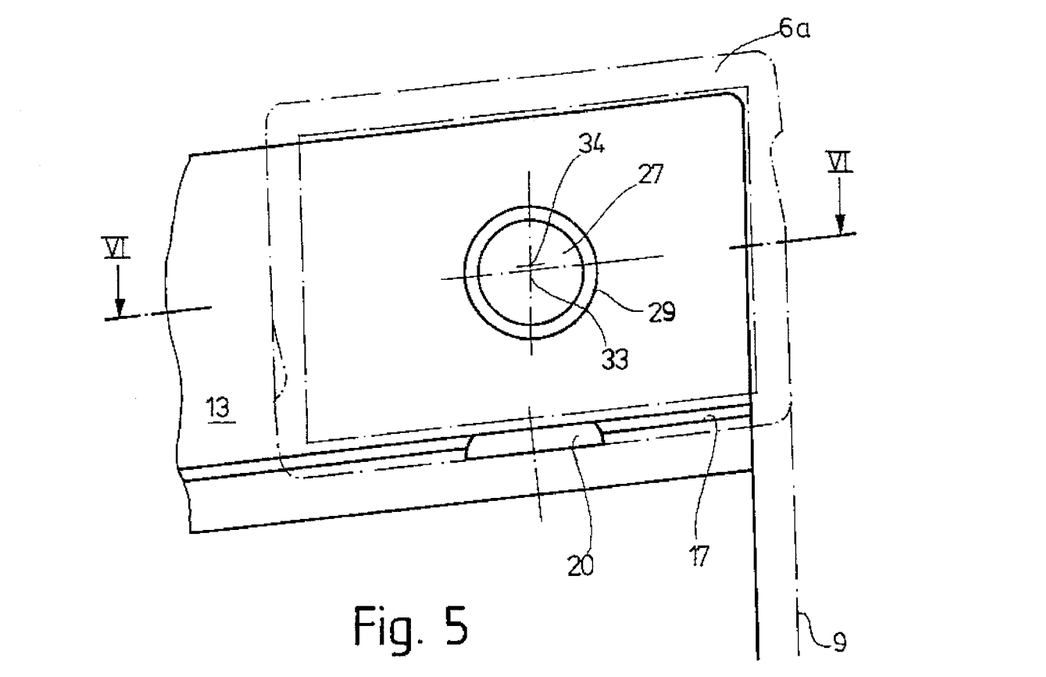
FIG. 5 is a top view of the reception seat for an insert, with the insert removed, and in which the clamping screw, likewise, has been removed.
Figure 6:
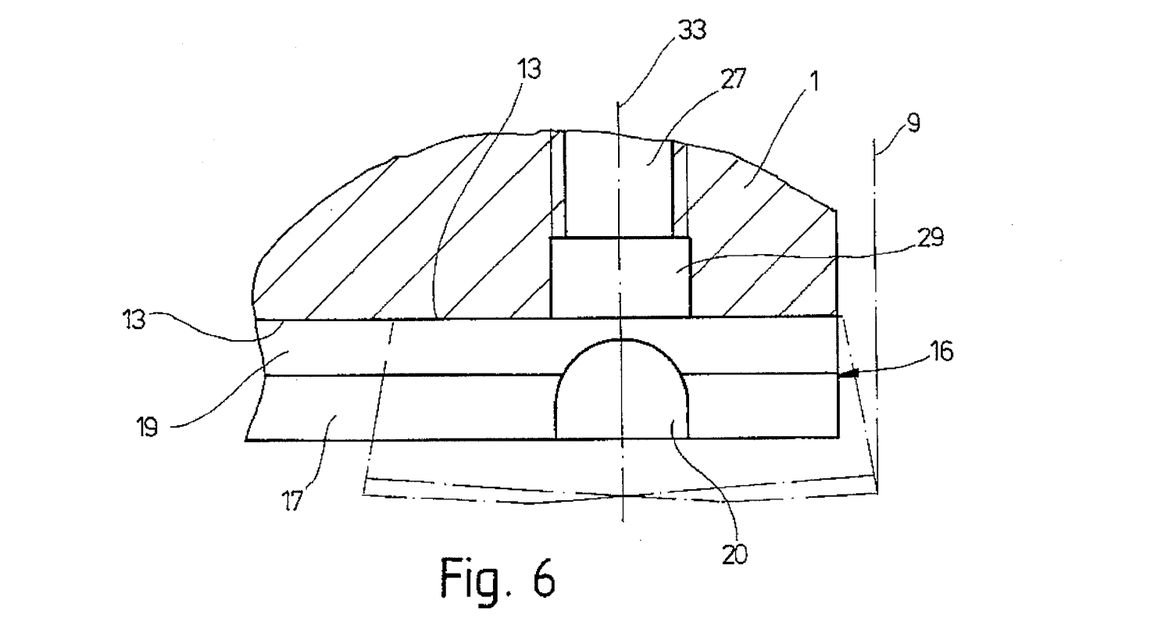
FIG. 6 is a fragmentary side view, in section, cut along the line VI–VI of FIG. 5.

Each one of the inserts 6, 6a is seated on an insert reception seat 10 (FIG. 4) which is groove or pocket-like in shape. These seats 10 are located in a wall 12 which is essentially radially directed with respect to the axis of rotation 11 (FIG. 1) of the tool body 1 and positioned within the respective groove 5. As best seen in FIGS. 4–6, each seat 10 has a flat seating surface 13 for the respective insert 6, 6a. The seating surface 13 is so arranged, in space, with respect to the axis of rotation 11 that the main or Circumferential cutting edge 7 of the insert 6, 6a operate with a predetermined axial and radial angle when running along the theoretical circle 14, while maintaining the design cutting geometry determined by the construction of the tool.

A side wall 16 is located adjacent the engagement surface 13, at the side close to the axis 11 of the tool (see FIG. 3).

In accordance with a feature of the invention, the side wall 16 is formed with an abutment surface 17, extending at least over the length of the insert 6, 6a, respectively. This engagement or abutment region 17 forms a radial abutment for the insert 6, 6a seated on the seating surface 13. The abutment surface or abutment region 17 is inclined in accordance with the inclination of the free surface 18 (see FIG. 4) of the insert 6, 6a, when the insert operates as a positive cutting insert. This ensures a precise, accurately positioned engagement for the insert 6, 6a, respectively.

The engagement region 17 extends over only a portion of the height of the side wall 16. It then continues to a surface region 19, extending at right angle to the seating surface 13, which is located spaced from the free surface 18 of the insert 6, 6a. This spacing ensures that the insert 6, 6a can be retained reliably, securely and accurately against the engagement surface 17. A groove-like recess 20 (see FIGS. 5, 6), worked into the side wall 16 from above, separates the engagement surface 17 into two portions of at least approximately equal length. This prevents that a cutting insert, due to sometimes unavoidable manufacturing tolerances, could run-on or tip due to a slightly non-planar surface, and which might lead to undefined engagement relationships of the respective insert 6, 6a against the engagement or abutment surface 17.

There is no abutment surface formed on the seating surface 13 in axial direction, for example in the direction of the axis of rotation 11, to ensure a surface-engagement fit for the respective insert 6, 6a. The respective subsequent radial shoulder 21 (FIG. 1), arising due to the spiral arrangement of the insert 6, 6a, is spaced from the respective insert 6, 6a, but is not precisely manufactured; it has no influence on the clamping of the respective insert.

The shape of the respective insert 6, 6a may be square (see FIG. 1), rectangular, parallelogram-shaped, or polygonal, shown in chain-dotted lines in FIGS. 5, 6. The inserts are formed with a hole or opening therethrough, that is, are apertured inserts, having an essentially cylindrical bore which, to the upper side of the respective insert, in cross section, adjoins a slightly convexly bowed conical end portion 23, and extends, at the end, to a countersink opening 24.

In accordance with the present invention, and to ensure accurate radial seating of the insert, and especially the insert 6a at the end, the clamping screw 25 is specifically constructed to have a precisely formed cylindrical portion 28 which, when assembled on the tool body, fits into a cylindrical, accurately positioned matching fitting bore 29 in the tool body 1. Generally, the screw 25, as best seen in FIG. 4, has a threaded portion 26 which fits into a threaded part 27, drilled and tapped into a suitable opening in the insert seat 10 of tool body 1.

The screw, formed with the engagement portion 28, then, towards the outside, has a short cylindrical region 30 of smaller diameter, extending, then, towards the clamping head 31. The clamping head 31 has an essentially conical clamping surface 32 which, when the screw clamps an insert in position in the body, engages on the conical surface 23 of the respective insert 6, 6a—as best seen in FIG. 4.

In accordance with another feature of the invention, the axis 33 of the tapped bore 27 and of the accurately machined portion 29 is slightly offset with respect to the direction of the axis 34 of the hole 22, 23 in the insert 6, 6a. The spacing of the offset is schematically shown in FIG. 4 by the double lines of the axis 33 and axis 34 of hole 22, 23. This offset is provided so that when the screw 25 is tightened, an engagement force will be applied against the respective insert 6, 6a towards the engagement surface 17, acting transversely to the axis 34. This force provides a pre-tensioning of the respective insert 6, 6a against the accurately positioned engagement surface 17.

OPERATION

Upon tightening of the screw 25 to clamp an insert 6, 6a against the engagement seat 10, the clamping surface 32 of the screw 25 engages the conical surface 23 of the respective insert chip 6, 6a. Since the portion 28 is guided in the portion of the bore 29 of the tool body 1 with tight tolerances, the insert 6, 6a is precisely positioned in axial direction by interengagement of the respective surfaces 28, 29. The support in this direction is formed by the clamping screw 25 itself. The portion of the screw 25 which extends in the bore 22 of the insert 6, 6a has a smaller diameter than the diameter of the bore 22. Thus, any elastic deformation of the screw 25 due to the offset of the axis 33 of the hole in the body 1 and the axis of the hole 22 in the insert, to provide for the engagement force of the insert against the engagement region 17 can be readily accepted and is not interfered with.

The invention can be applied to various types of machine tools, and particularly milling and boring tools. It has been described first in connection with a milling head which, as is readily in seen in FIG. 1, is right cutting with a left spiral. The invention is equally applicable to milling tools which are right spiral and right cutting; in general, the shape and construction of the respective rotary cutting tools do not present any particular limitations for application of the present invention.

Figure 7:
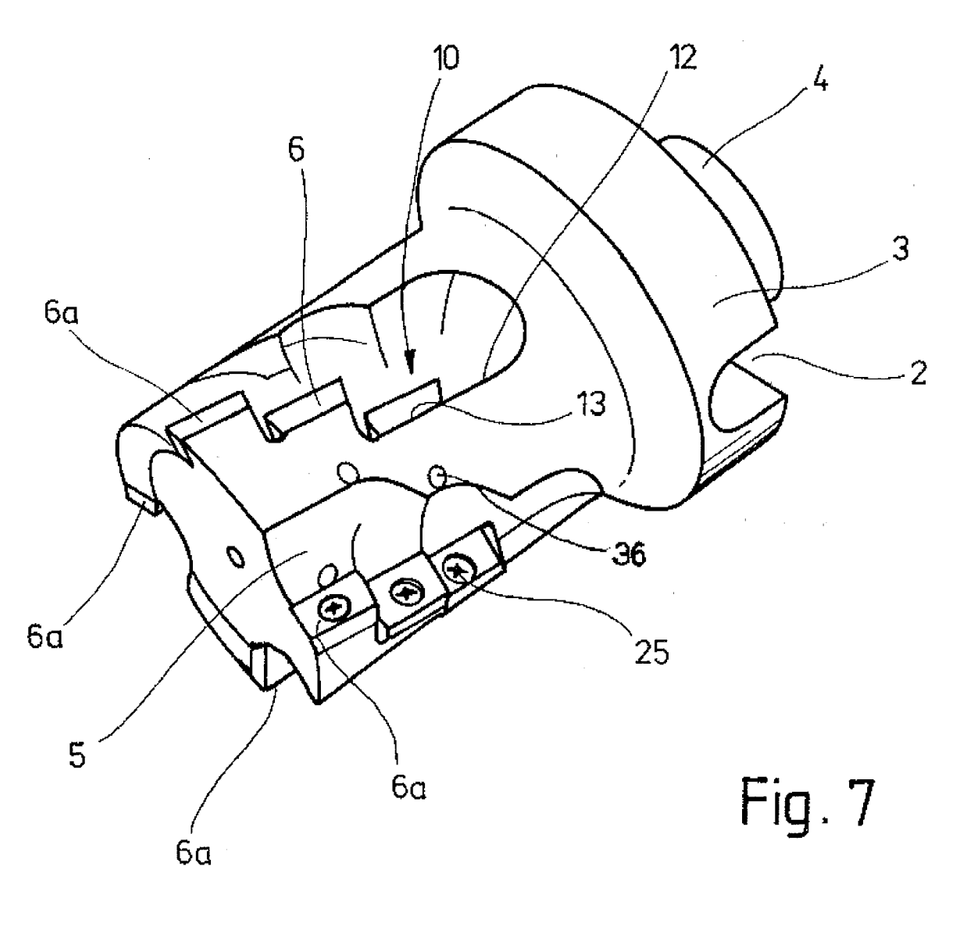
FIG. 7 is a view similar to FIG. 1, in which the milling head, however, is a right spiral head, for right cutting, and fitted with insert chips arranged along four spiral insert grooves.

FIG. 7 illustrates a right cutting, right spiral milling head which, basically, is similar to the milling tool described in connection with FIGS. 1–6. The milling head of FIG. 7 has, again, four cutting grooves. Similar parts have been given the same reference numerals and will not be described again.

As illustrated in FIG. 7, the cutting inserts 6, 6a are free at the side facing the flange 3 of the tool body 1; thus, the shoulder 21 of FIG. 1, which is an extension of the respective seating surfaces 13, is omitted. In such a tool, use of a pin or bolt as an axial engagement for the respective cutting inserts, as was customary in the prior art, leads to great difficulties, since the space relationship is tight and cutting chips would be impeded from being cleared from the tool by such pins or bolts. Additionally, the danger of cutting chips catching in and wedging in such positioning pins or bolts arises.

Forming such a tool in accordance with the present invention completely eliminates any further engagement or positioning elements since the clamping screw 25, with the interengaging surfaces thereof, in combination with the fitting surface in the tool body, is the only element other than the engagement surface 17 in the region of the cutting inserts. As is clearly apparent from FIG. 7, cutting chips are readily removed from the cutting area.

The tools, described above, actually require use of the present invention only at the end cutting inserts 6a. These cutting inserts cut at the end faces and at the corners, and extend over the tool body in two dimensions. These cutting inserts 6a are securely maintained in position in axial direction as well as in radial direction by use of the present invention; the forces arising at the end facing edges 7a and transferred to the cutting insert 6a can be reliably accepted. These forces act in axial direction.

The cutting inserts which cut only at the circumference are not subjected to high axial forces. Thus, it is usually not necessary to provide for cutting inserts 6, along the grooves, precisely axially secure and reliable engagement and support. In dependence on use of the tool, as well as for reasons of uniformity and standardization, as well as standardization of holding torques, the arrangement of axial as well as radial support by the interengaging clamping screws and holding openings as well as the surfaces 17 may be used for all of the cutting inserts 6 and 6a.

As illustrated, the bores 27 and the fitting portion 29 are formed directly in the tool body 1. Some tools of large diameters use cassettes which are secured to a tool body, in which the cassettes are formed with the actual seating surfaces 10. These cassettes are then replaceable and can in turn be secured, for example by screws or the like, to the basic rotating tool body. In such instances, the threaded bore as well as the accurately finished portion 29 must be supplied in the cassette. When reference is made in the specification and claims to "tool body", it is of course, understood that such cassettes form part of the tool body.

The embodiment described, and particularly FIGS. 4 and 5, shows the axis 33 of the bore 27 and the portion 29 to extend at a right angle to the engagement surface 13 of the respective insert 6, 6a. This is not a necessary requirement, and other arrangements can be used, for example some in which the axis 33 has an angle which differs from 90° with respect to the seating surface 13, for example in order to press the respective insert against the surface 17 or any other abutment.

The tool body 1 can be readily supplied with a cooling duct 35 (FIG. 2) from which branch ducts 36 with outlets adjacent the cutting insert 6, 6a extend.

Various changes and modifications may be made, and any features described herein may be used with any of the others, within the scope of the inventive concept.

A suitable offset between the axes 33, 34 (FIG. 4) for a milling tool in which the body has a nominal diameter of 40 mm is 0.1 mm. A suitable outer diameter of the portion 28 of the screw 25, which is preferably made of high-quality steel, is 2.6 mm.

We claim:

1. Rotary cutting tool with a plurality of spirally arranged cutting inserts (6) and at least one axially precision positioned end cutting insert (6a) having a tool body (1) formed as a body of rotation, and further formed with a plurality of insert reception seats (10) for respective cutting inserts (6, 6a), at least one of said cutting inserts (6, 6a) being formed with an, in cross section, circular through-bore (22, 23), said reception seats receiving and supporting the at least one cutting insert on the respective seat with respect to radial direction and axial direction, said through-bore defining an end portion or opening edge remote from said seat;

a threaded bore (27) formed in said body, intersecting said respective reception seat (10);

a clamping screw (25) having an, in cross section, circular clamping head (31) passing through the bore of the insert and threaded into the threaded bore (27) of the body, said clamping head releasably clamping the respective insert against the respective insert reception seat (10), comprising means for accurately positioning said at least one insert on the respective reception seat (10), and supporting said at least one insert, in operation, with respect to forces acting on the at least one cutting insert (6, 6a) in said directions, said means including a single precision abutment (17) formed on the body at a side of the reception seat (10) for positioning and supporting the insert in one of said directions; and an interengaging fit formed between said screw (25) and said threaded bore (27) in the body (1), respectively, for supporting the insert in other directions than said one direction;

wherein said clamping screw (25) is an accurately machined screw having a precisely diametrically dimensioned shank portion (28), and said threaded bore (27) is formed with a precisely dimensioned reception portion (29) in fitting engagement with said precisely diametrically dimensioned shank portion (28) of the clamping screw (25);

wherein said clamping head (31) of the clamping screw has a diameter which is greater than the smallest diameter of the through-bore (22, 23) in the at least one insert (6, 6a), and has a threaded portion remote from said clamping head fitting into said threaded bore (27) in the tool body (1); and wherein the axis (33) of the precisely dimensioned portion (29) of the threaded bore (27) in the tool body (1) is offset with respect to the axis (34) of the through-bore (22, 23) of the at least one insert (6, 6a) in the direction of said single precision abutment (17) by a small dimension, whereby, upon tightening of the clamping screw (25), said at least one cutting insert (6, 6a) is supported and positioned by engagement against said single abutment (17) with respect to forces acting in said one direction, and, by said clamping screw (25), with respect to forces acting in directions other than said one direction, by force engagement of the clamping head (31) of the clamping screw against the end portion or opening edge (23) of the through-bore (22) in the at least one cutting insert (6, 6a) essentially throughout the entire circumference of said end portion, and the clamping head, respectively, and by axial stress on the clamping screw (25).

2. The tool of claim 1, wherein said single precision abutment (17) supports the cutting insert (6, 6a) only with respect to forces acting in radial direction, said radial direction forming said one of said directions.

3. The tool of claim 2, wherein said interengaging fit formed by said screw and by said threaded bore comprises a cylindrical portion (28) formed on the screw and a cylindrical portion (29) formed in the threaded bore.

4. The tool of claim 1 wherein said rotary cutting tool has cutting inserts (6) cutting only in circumferential direction, and at least one end cutting insert (6a) cutting with an end edge (7a) as well as circumferentially; and wherein only said end edge cutting insert (6a) is supported with respect to forces acting in axial direction by said screw (25) having said interengaging fit with said bore (27) in the body (1).

5. The tool of claim 1, wherein said at least one cutting insert comprises an end cutting insert (6a), and is supported with respect to forces acting in axial direction said interengaging fit between the bore (27) in the body (1) with the shank portion (28) of said screw (25), said axial direction forming another direction than said one direction.

6. The tool of claim 1, wherein said interengaging fit formed by said screw and by said threaded bore comprises a cylindrical portion (28) formed on the screw and a cylindrical portion (29) formed in the threaded bore.

7. The tool of claim 6, wherein said at least one cutting insert comprises an end cutting insert (6a), and is supported with respect to forces acting in axial direction by said interengaging fit between the bore (27) in the body (1) with the shank portion (28) of said screw (25), said axial direction forming another direction than said one direction.

8. The tool of claim 9, wherein said clamping head (31 has a conical portion (32); and wherein said end portion (23) of the bore (22) is conical, with a cone angle similar to that of the cone angle of said conical portion of the clamping screw (25).

9. The tool of claim 8, wherein said at least one cutting insert comprises an end cutting insert (6a), and is supported with respect to forces acting in axial direction by said interengaging fit between the bore (27) in the body (1) with the shank portion (28) of said screw (25), said axial direction forming another direction than said one direction.

10. The tool of claim 8, wherein said interengaging fit formed by said screw and by said threaded bore comprises a cylindrical portion (28) formed on the screw and a cylindrical portion (29) formed in the threaded bore.

* * * * *